United States Patent
Washino

(10) Patent No.: US 11,505,647 B2
(45) Date of Patent: Nov. 22, 2022

(54) RESIN MOLDED ARTICLE COMPRISING WHOLLY AROMATIC LIQUID CRYSTALLINE POLYESTER RESIN CAPABLE OF REDUCING DIELECTRIC LOSS TANGENT BY HEAT TREATMENT AND ELECTRICAL AND ELECTRONIC COMPONENT

(71) Applicant: ENEOS Corporation, Tokyo (JP)

(72) Inventor: Gosuke Washino, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 140 days.

(21) Appl. No.: 17/253,771

(22) PCT Filed: Apr. 8, 2019

(86) PCT No.: PCT/JP2019/015305
§ 371 (c)(1),
(2) Date: Dec. 18, 2020

(87) PCT Pub. No.: WO2020/003690
PCT Pub. Date: Jan. 2, 2020

(65) Prior Publication Data
US 2021/0269588 A1 Sep. 2, 2021

(30) Foreign Application Priority Data
Jun. 26, 2018 (JP) .............................. JP2018-121248

(51) Int. Cl.
*C08G 63/60* (2006.01)
*H01B 3/42* (2006.01)

(52) U.S. Cl.
CPC ........... *C08G 63/605* (2013.01); *H01B 3/423* (2013.01)

(58) Field of Classification Search
CPC ........ C08G 63/60; C08G 63/605; H01B 3/42; H01B 3/423; C08J 5/18; C08J 2367/03; C08J 7/08; C08L 67/03; C08L 2203/20
See application file for complete search history.

(56) References Cited

U.S. PATENT DOCUMENTS

| 2007/0182059 A1 | 8/2007 | Ikegawa et al. |
| 2019/0202978 A1 | 7/2019 | Washino |
| 2020/0040133 A1* | 2/2020 | Washino ............... C08G 63/189 |

FOREIGN PATENT DOCUMENTS

| CN | 1462287 A | 12/2003 | |
| CN | 1930241 A | 3/2007 | |
| EP | 1319678 A1 | 6/2003 | |
| JP | 2003-292638 A | 10/2003 | |
| JP | 2004-250620 A | 9/2004 | |
| JP | 2005-290371 A | 10/2005 | |
| JP | 2006-137786 A | 6/2006 | |
| JP | 2006137786 * | 6/2006 | ............... C08J 7/00 |
| JP | 2007-154169 A | 6/2007 | |
| JP | 2011-202290 A | 10/2011 | |
| KR | 10-2006-0131916 A | 12/2006 | |
| WO | WO2017135365 * | 8/2017 | ............. C08G 63/60 |
| WO | WO 2018/008612 A1 | 1/2018 | |

OTHER PUBLICATIONS

Japanese Patent Office, International Preliminary Report on Patentability in International Patent Application No. PCT/JP2019/015305 (dated Jan. 7, 2021).
Korea Intellectual Property Office, Notification of Reason for Refusal in Korean Patent Application No. 10-2020-7035031 (dated Feb. 18, 2022).
European Patent Office, Extended European Search Report in European Patent Application No. 19826049.9 (dated Feb. 4, 2022).
Japanese Patent Office, International Search Report in International Patent Application No. PCT/JP2019/015305 (dated Jun. 25, 2019).
China National Intellectual Property Administration, Office Action in Chinese Patent Application No. 201980041116.0 (dated Jun. 9, 2022).

* cited by examiner

Primary Examiner — Robert S Jones, Jr.
(74) Attorney, Agent, or Firm — Leydig, Voit & Mayer, Ltd.

(57) ABSTRACT

The invention provides a resin molded article containing a wholly aromatic liquid crystalline polyester resin and formed by being subjected to heat treatment, in which the enthalpy change $\Delta H_1$ at the melting point of the first cycle and the enthalpy change $\Delta H_2$ at the melting point of the second cycle of the temperature elevation process measured by a differential scanning calorimeter satisfy $\Delta H_1/\Delta H_2 \geq 2.0$, and the dielectric loss tangent measured by the split-post dielectric resonator (SPDR) method at a measurement frequency of 10 GHz is $0.85 \times 10^{-3}$ or less.

12 Claims, 1 Drawing Sheet

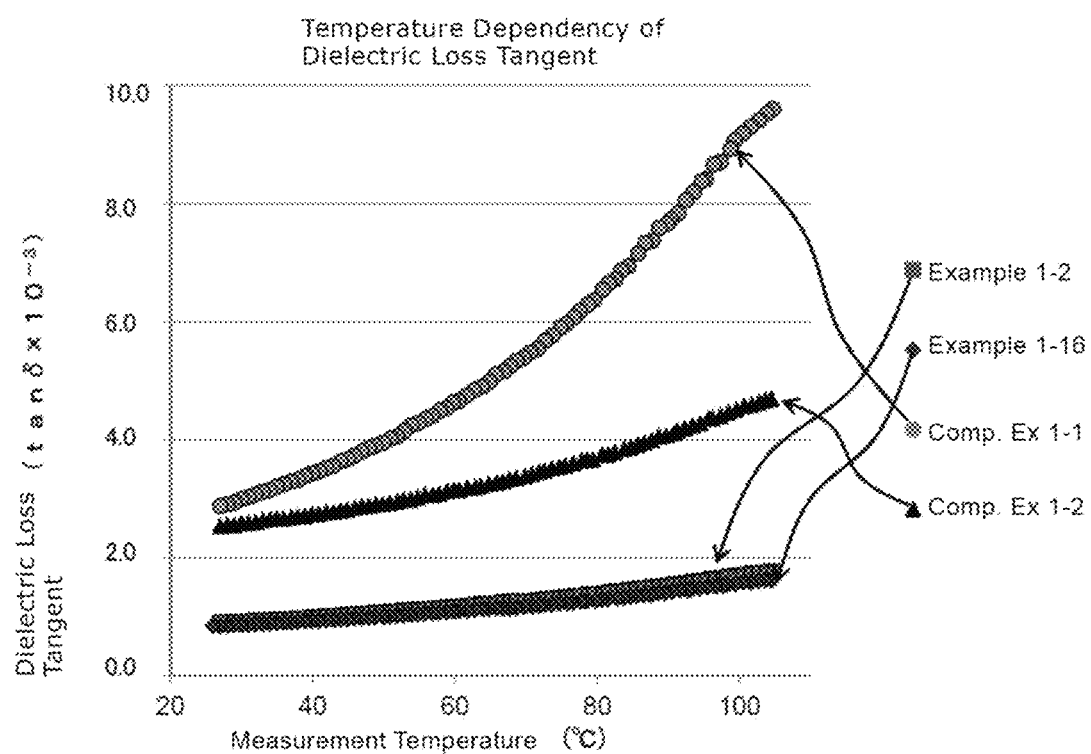

RESIN MOLDED ARTICLE COMPRISING WHOLLY AROMATIC LIQUID CRYSTALLINE POLYESTER RESIN CAPABLE OF REDUCING DIELECTRIC LOSS TANGENT BY HEAT TREATMENT AND ELECTRICAL AND ELECTRONIC COMPONENT

CROSS-REFERENCE TO RELATED APPLICATIONS

This patent application is the U.S. national phase of International Patent Application No. PCT/JP2019/015305, filed Apr. 8, 2019, which claims the benefit of Japanese Patent Application No. 2018-121248, filed on Jun. 26, 2018, which are incorporated by reference in their entireties herein.

FIELD OF THE INVENTION

The present invention relates to a resin molded article containing a wholly aromatic liquid crystalline polyester resin which is capable of reducing the dielectric loss tangent by heat treatment, and more particularly to a resin molded article containing a wholly aromatic liquid crystalline polyester resin having a particularly low dielectric loss tangent and an electrical and electronic component comprising the molded article.

BACKGROUND ART

In recent years, along with the increasing amount of information and telecommunication in the communication field, signals having frequencies in the high-frequency band are used more in electronic equipment, telecommunication equipment, and the like, and in particular, active use is made to signals having frequencies in the gigahertz (GHz) band in which the frequency is $10^9$ Hz or more. For example, a high frequency band of the GHz band is used in the automobile field. Specifically, millimeter-wave radars and quasi-millimeter-wave radars which are mounted for the purpose of preventing collisions of automobiles use high frequencies of 76 to 79 GHz and 24 GHz, respectively, and their use is expected to further increase in the future.

However, as the frequency of the signal to be used becomes higher, the quality of the output signal deteriorates, which may cause misrecognition of information, that is, the transmission loss becomes larger. This transmission loss consists of a conductor loss caused by a conductor and a dielectric loss caused by an insulating resin constituting the electrical and electronic component such as a substrate in an electronic device or a telecommunication device, and since the conductor loss is proportional to 0.5 power of the frequency used and the dielectric loss is proportional to 1 power of the frequency, the influence of the dielectric loss becomes extremely large in the high frequency band, particularly in the GHz band. Since the dielectric loss also increases in proportion to the dielectric loss tangent of the resin, a resin having a low dielectric loss tangent property is required to prevent deterioration of information.

To solve the above problem, Patent Document 1 proposes a liquid crystalline aromatic polyester comprising two or more structural units derived from p- or m-hydroxybenzoic acid and structural units derived from hydroxynaphthoic acid as a liquid crystalline aromatic polyester exhibiting a low dielectric loss tangent in the high frequency band.

Resins constituting the electrical and electronic component are required to have high heat resistance to heating during molding, and resin molded articles such as films formed using the resins are required to have high heat resistance to heat processing by means of solder or the like. Therefore, for example, Patent Document 2 proposes improving heat resistance by adjusting the crystallinity and density of the film by heat treatment of the film.

PRIOR ART DOCUMENTS

Patent Document

Patent Document 1: Japanese Patent Application Laid-Open No. 2004-250620
Patent Document 2: Japanese Patent Application Laid-Open No. 2003-292638

SUMMARY OF THE INVENTION

Problems to be Solved by the Invention

In recent years, the amount of information and telecommunication has been rapidly increasing and higher frequency of signals has been used more, thus there is a need for a resin having an even lower dielectric loss tangent in the high frequency band. The present inventors have found that the use of polyester resin proposed in Patent Document 1 does not exhibit a sufficiently low dielectric loss tangent required in the high frequency band. Further, although the heat treatment of the film has conventionally been aimed at improving heat resistance as in Patent Document 2, the present inventors have found that the dielectric properties can be greatly improved by heat treatment when the resin satisfies a specific condition.

It is therefore an object of the present invention to provide a resin molded article comprising a wholly aromatic liquid crystalline polyester resin having a remarkably low dielectric loss tangent and high heat resistance even in the high frequency band.

Means for Solving the Problem

As a result of intensive studies to solve the above-mentioned problem, the present inventors have found that a resin molded article having a remarkably low dielectric loss tangent can be obtained, when the resin molded article which comprises a wholly aromatic liquid crystalline polyester resin and is formed by being subjected to heat treatment has the enthalpy change $\Delta H_1$ at the transition temperature from the crystal phase to the liquid crystal phase in the first cycle (hereinafter referred to as "melting point") and the enthalpy change $\Delta H_2$ at the melting point in the second cycle during the temperature elevation process measured by a differential scanning calorimeter satisfying a specific relationship. The present invention has been completed based on such finding.

That is, according to one embodiment of the present invention, there is provided a resin molded article comprising a wholly aromatic liquid crystalline polyester resin and formed by being subjected to heat treatment, wherein the enthalpy change $\Delta H_1$ at the melting point of the first cycle and the enthalpy change $\Delta H_2$ at the melting point of the second cycle of the temperature elevation process measured by a differential scanning calorimeter satisfy $\Delta H_1/\Delta H_2 \geq 2.0$, and the dielectric loss tangent measured by the SPDR method at a measurement frequency of 10 GHz is $0.85 \times 10^{-3}$ or less.

In the embodiment of the present invention, the enthalpy change $\Delta H_1$ at the melting point in the first cycle of the temperature elevation process measured by a differential scanning calorimeter is preferably 3.5 J/g or more.

In the embodiment of the present invention, the wholly aromatic liquid crystalline polyester resin preferably contains three or more structural units.

In the embodiment of the present invention, the wholly aromatic liquid crystalline polyester resin preferably comprises 10 mol % or more of structural unit (I) derived from 6-hydroxy-2-naphthoic acid with respect to the structural unit of the entire wholly aromatic liquid crystalline polyester resin.

In the embodiment of the present invention, the wholly aromatic liquid crystalline polyester resin preferably further comprises structural unit (II) derived from an aromatic diol compound and structural unit (III) derived from an aromatic dicarboxylic acid.

In the embodiment of the present invention, the wholly aromatic liquid crystalline polyester resin preferably further comprises structural unit (IV) derived from p-hydroxybenzoic acid.

According to another embodiment of the present invention, there is provided an electrical and electronic component comprising the resin molded article.

Effect of the Invention

According to the present invention, the enthalpy change $\Delta H_1$ at the melting point of the first cycle and the enthalpy change $\Delta H_2$ at the melting point of the melting point of the second cycle in the temperature elevation process measured by a differential scanning calorimeter satisfying a specific relationship make it possible to realize a resin molded article comprising a wholly aromatic liquid crystalline polyester resin having an excellent heat resistance while having an extremely low dielectric loss tangent.

BRIEF DESCRIPTION OF DRAWINGS

FIG. 1 is a measurement result of the dielectric loss tangent of a wholly aromatic polyester resin at 34 GHz (temperature dependency from 30° C. to 100° C.).

MODE FOR CARRYING OUT THE INVENTION (Resin Molded Article)

The resin molded article of the present invention comprises the following wholly aromatic liquid crystalline polyester resin and is subjected to heat treatment (annealing). Appropriate heat treatment of the resin molded article improves the crystallinity of the polymer and accordingly, heat resistance of the molded article can be improved. The elevation degree in crystallinity of the molded article can be evaluated by a differential scanning calorimeter (DSC). For example, the enthalpy change $\Delta H_1$ at the melting point of the first cycle of the temperature elevation process indicates the degree of crystallinity obtained by heat treatment. Since the melting point of the second cycle after once melted corresponds to the phase transition phenomenon of the bulk state in which the heat treatment history of the resin has been removed, the elevation degree in $\Delta H_1$ with respect to the enthalpy change $\Delta H_2$ at this point ($\Delta H_1/\Delta H_2$) is an index of the elevation degree in crystallinity in the evaluation portion of the molded article.

In the present invention, by adjusting $\Delta H_1/\Delta H_2$ within a specific numerical range by heat treatment of the resin molded article, surprisingly, it is possible to realize an extremely low dielectric loss tangent even in the high frequency band.

In the resin molded article, the enthalpy change $\Delta H_1$ at the melting point of the first cycle and an enthalpy change $\Delta H_2$ at the melting point of the second cycle of the temperature elevation process measured by a differential scanning calorimeter satisfy $\Delta H_1/\Delta H_2 \geq 2.0$, preferably satisfy $\Delta H_1/\Delta H_2 \geq 2.5$, more preferably satisfy $\Delta H_1/\Delta H_2 \geq 3.0$, still more preferably satisfy $\Delta H_1/\Delta H_2 \geq 4.0$, and still more preferably satisfy $\Delta H_1/\Delta H_2 \geq 5.0$. When the resin molded article have $\Delta H_1/\Delta H_2 \geq 2.0$, it can be said the improvement of crystallinity is significantly higher than that in the state before the heat treatment, and accordingly, the dielectric loss tangent is reduced because the molecular vibration can be suppressed in the entire material.

In the resin molded article, the enthalpy change $\Delta H_1$ at the melting point in the first cycle of the temperature elevation process as measured by a differential scanning calorimeter is preferably 3.5 J/g or more, more preferably 4 J/g or more, still preferably 5 J/g or more, still more preferably 7 J/g or more, and particularly preferably 8 J/g or more. When $\Delta H_1$ is 3.5 J/g or more, the resin molded article can be said to have a high crystallinity in an absolute value as a wholly aromatic liquid crystalline polyester resin, and thus it is possible to realize a reduction in the dielectric loss tangent.

In the present specification, the measurement conditions of the differential scanning calorimeter are in 2 cycles, including a process of elevating the temperature from 30° C. to 360-380° C. at a temperature elevation rate of 10° C./min in a nitrogen atmosphere and a process of lowering the temperature from 360-380° C. to 30° C. at a temperature falling rate of 10° C./min as 1 cycle.

The enthalpy change $\Delta H_1$ at the melting point can be adjusted by changing the polymerization conditions (temperature and time) of the polymerization reaction in the manufacturing method of the wholly aromatic liquid crystalline polyester resin described in details below and the conditions of heat treatment (annealing) of the molded article in the manufacturing method of the resin molded article described in details below.

From the viewpoint of heat resistance in actual use, the melting point of the resin molded article has a lower limit of 290° C. or higher, more preferably 295° C. or higher, still preferably 300° C. or higher, still more preferably 310° C. or higher, and the upper limit for molding of preferably 370° C. or lower, more preferably 360° C. or lower, and still preferably 350° C. or lower. When the melting point of the resin molded article according to the present invention is within the above-described numerical range, the resin molded article is excellent in heat resistance and workability, and heat resistance and dielectric loss tangent can be improved advantageously by heat treatment. Note that, in the present specification, the melting point of the resin-molded article was determined in accordance with the test methods of ISO11357, ASTM D3418, which can be measured using a differential scanning calorimeter (DSC) manufactured by Hitachi High-Tech Science Co., Ltd., and was defined as the temperature (° C.) of the vertex ($Tm_2$) of the heat absorption peak associated with the transition from the crystalline phase to the liquid crystalline phase in the second cycle of the temperature elevation process measured by DSC.

The dielectric loss tangent (measurement frequency: 10 GHz) of the resin molded article after heat treatment measured by the SPQR method is $0.85 \times 10^{-3}$ or less, preferably $0.80 \times 10^{-3}$ or less, more preferably $0.75 \times 10^{-3}$ or less, and still preferably $0.70 \times 10^{-3}$ or less.

The dielectric loss tangent (measurement frequency: 34 GHz) of the resin molded article after heat treatment at 25° C. measured by a cylindrical cavity resonator method is $1.5 \times 10^{-3}$ or less, preferably $1.2 \times 10^{-3}$ or less, and more preferably $1.0 \times 10^{-3}$ or less.

The dielectric loss tangent (measurement frequency: 81 GHz) of the resin molded article after the heat treatment at 25° C. measured by a cylindrical cavity resonator method is $3.0 \times 10$ or less, preferably $2.5 \times 10^{-3}$ or less, and more preferably $2.0 \times 10^{-3}$ or less.

The resin molded article after heat treatment has a dielectric loss tangent (measurement frequency: 34 GHz) at 30° C. and 100° C. of preferably $2.0 \times 10^{-3}$ or less and $3.0 \times 10^{-3}$ or less, more preferably $1.5 \times 10^{-3}$ or less and $2.5 \times 10^{-3}$ or less, and still more preferably $1.0 \times 10^{-3}$ or less and $2.0 \times 10^{-3}$ or less, respectively.

Further, with respect to the resin molded article after heat treatment, the change rate of the dielectric loss tangent from 30° C. to 100° C. at a measurement frequency of 34 GHz is preferably $2.5 \times 10^{-5}/°$ C. or less, more preferably $2.0 \times 10^{-5}/°$ C. or less, and still preferably $1.5 \times 10^{-5}/°$ C. or less. The small change rate of the dielectric loss tangent dependent of the temperature makes it possible to stably exhibit physical properties according to the design even when the temperature changes during the use of the material. Therefore, contribution can be made to the operation stability of the device in which the material is used in each environment.

Note that, in the present specification, the dielectric loss tangent of wholly aromatic liquid crystalline polyester resin at 10 GHz can be measured by a split-post dielectric resonator method (SPDR method) using network analyzer N5247A of Keysight Technologies, or the like. Other dielectric loss tangent can be measured by the cylindrical cavity resonator method. In addition, unless otherwise specified, the value of the dielectric loss tangent is a value measured at 23° C. in an atmosphere and 60% humidity.

(Wholly Aromatic Liquid Crystalline Polyester Resin)

The wholly aromatic liquid crystalline polyester resin used in the resin molded article of the present invention preferably contains three or more structural units and more preferably four or more structural units. The structural unit of the totally aromatic liquid crystalline polyester resin includes structural unit (I) derived from 6-hydroxy-2-naphthoic acid, structural unit (II) derived from an aromatic diol compound, and structural unit (III) derived from an aromatic dicarboxylic acid. Each structural unit comprised in the wholly aromatic liquid crystalline polyester resin will be described below.

(Structural Unit (I) Derived from 6-Hydroxy-2-Naphthoic Acid)

The wholly aromatic liquid crystalline polyester resin preferably contains structural unit (I) derived from 6-hydroxy-2-naphthoic acid represented by formula (I) as below. The composition ratio (mol %) of structural unit (I) to the structural unit of the wholly aromatic liquid crystalline polyester resin is preferably 10 mol % or more, more preferably 30 mol % or more, still preferably 40 mol % or more, still more preferably 50 mol % or more, and the upper limit is preferably 70 mol % or less, more preferably 65 mol % or less, and still preferably 60 mol % or less, from the viewpoint of lowering the dielectric loss tangent of the resin molded article.

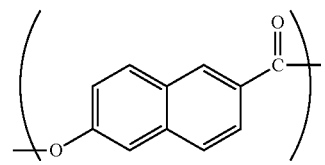

(I)

Examples of the monomer for providing structural unit (I) include 6-hydroxy-2-naphthoic add (HNA, represented by the following formula (1)) and its acetylated product, ester derivative, add halide, and the like.

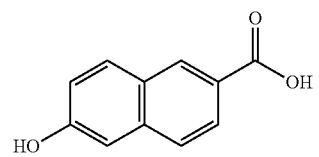

(1)

(Structural Unit (II) Derived from Aromatic Diol Compound)

The wholly aromatic liquid crystalline polyester resin preferably comprises structural unit (II) derived from an aromatic diol compound. The composition ratio (mol %) of structural unit (II) to the structural unit of the wholly aromatic liquid crystalline polyester resin has a lower limit of preferably 15 mol % or more, more preferably 17.5 mol % or more, still preferably 20 mol % or more, and an upper limit of preferably 45 mol % or less, more preferably 35 mol % or less, and still preferably 30 mol % or less from the viewpoint of lowering the dielectric loss tangent of the wholly aromatic liquid crystalline polyester resin. In a case where two or more of structural units (II) derived from the aromatic diol compound are contained, the total molar ratio thereof may be within the above composition ratio.

In one embodiment, structural unit (II) is represented by the following formula (II):

(II)

wherein $Ar^1$ is selected from the group consisting of optionally substituted phenyl, biphenyl, 4,4'-isopropylidene diphenyl, naphthyl, anthryl and phenanthryl groups. Amongst these, phenyl and biphenyl groups are more preferred. Examples of the substituent include hydrogen, an alkyl group, an alkoxy group, fluorine, and the like. The number of carbons in the alkyl group is preferably 1 to 10 and more preferably 1 to 5. The alkyl group may be a linear alkyl group or a branched alkyl group. The number of carbons in the alkoxy group is preferably 1 to 10 and more preferably 1 to 5.

Examples of the monomer for providing structural unit (II) include 4,4-dihydroxybiphenyl (BP, formula (2) as below), hydroquinone (HQ, formula (3) as below), methyl hydroquinone (MeHQ, formula (4) as below), 4,4'-isopropylidenediphenol (BisPA, formula (5) as below), and acylated products thereof.

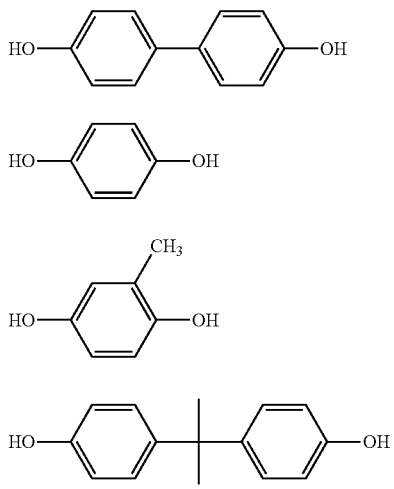

(2)

(3)

(4)

(5)

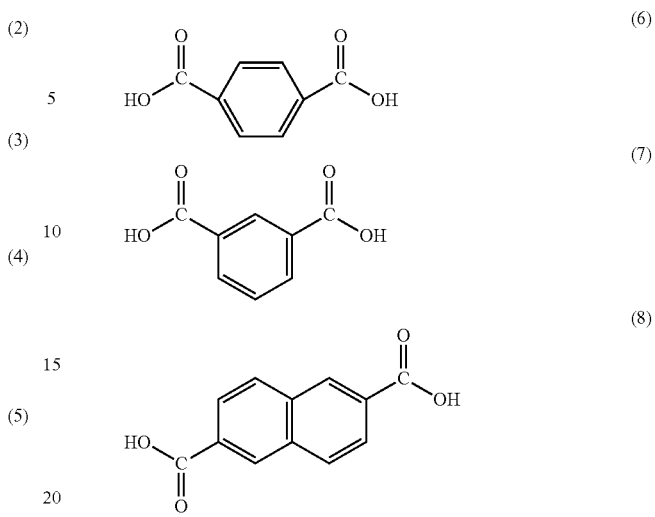

(6)

(7)

(8)

(Structural Unit (III) Derived from Aromatic Dicarboxylic Acid)

The wholly aromatic liquid crystalline polyester resin preferably contains structural unit (III) derived from an aromatic dicarboxylic acid. From the viewpoint of lowering the dielectric loss tangent of the wholly aromatic liquid crystalline polyester resin, the composition ratio (mol %) of the structural unit (III) to the structural unit of the entire wholly aromatic liquid crystalline polyester resin has a lower limit of preferably 15 mol % or more, more preferably 17.5 mol % or more, still more preferably 20 mol % or more, and an upper limit of preferably 45 mol % or less, more preferably 35 mol % or less, and still more preferably 30 mol % or less. When two or more structural units (III) derived from aromatic dicarboxylic adds are contained, the total molar ratio thereof may be within the range of the above composition ratio.

In one embodiment, structural unit (III) is represented by formula (III):

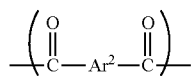

(III)

wherein, Ar$^2$ is selected from the group consisting of phenyl, biphenyl, naphthyl, anthryl and phenanthryl groups optionally having a substituent. Among these, a phenyl group is more preferable. Examples of the substituent include hydrogen, an alkyl, an alkoxy group, and fluorine. The number of carbons in the alkyl group is preferably 1 to 10 and more preferably 1 to 5. The alkyl group may be a linear or a branched alkyl group. The number of carbons in the alkoxy group is preferably 1 to 10 and more preferably 1 to 5.

Examples of the monomer which gives the structural unit (III) include terephthalic acid (TPA, formula (6) below), isophthalic acid (IPA, formula (7) below), 2,6-naphthalenedicarboxylic acid (NADA, formula (8) below), ester derivatives thereof, acid halides, and the like.

(Structural Unit Derived from p-Hydroxybenzoic Acid (IV))

The wholly aromatic liquid crystalline polyester resin may further contain structural unit (IV) derived from p-hydroxybenzoic add represented by formula (IV) below. The composition ratio (mol %) of the structural unit (IV) to the structural unit of the wholly aromatic liquid crystalline polyester resin has an upper limit of preferably 10 mol % or less, more preferably 8 mol % or less, and still preferably 5 mol % or less from the viewpoint of lowering the dielectric loss tangent of the wholly aromatic liquid crystalline polyester resin and high heat resistance.

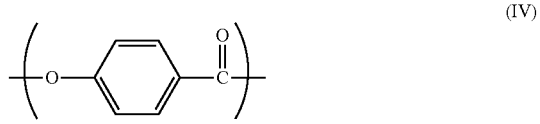

(IV)

Examples of the monomer which gives the structural unit (IV) include p-hydroxybenzoic acid (HBA, formula (9) below), an acetylated product thereof, ester derivative, add halide, and the like.

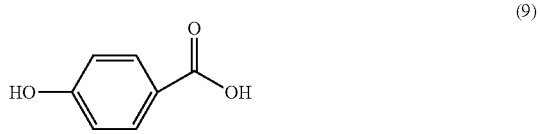

(9)

The liquid crystallinity of the wholly aromatic liquid crystalline polyester resin can be confirmed by heating and melting the wholly aromatic liquid crystalline polyester resin on a microscope heating stage using a polarizing microscope (product name: BH-2) manufactured by Olympus Co., Ltd. having a microscope hot stage (product name: FP82HT) manufactured by Mettler, and observing the presence or absence of optical anisotropy, (Manufacturing Method of Wholly Aromatic Liquid Crystalline Polyester Resin)

The wholly aromatic liquid crystalline polyester resin according to the present invention can be produced as needed by polymerizing monomers which give structural units (I) to (IV) by conventional methods such as melt polymerization, solid phase polymerization, solution polymerization and slurry polymerization. In one embodiment, the wholly aromatic liquid crystalline polyester resin according to the present invention can be produced solely by melt polymerization. It can also be produced by 2 step polymerizations in which a prepolymer is prepared by melt polymerization and the prepolymer is further subjected to solid phase polymerization.

From the viewpoint of efficiently obtaining the polyester compound according to the present invention, the melt polymerization is preferably carried out under acetic acid reflux in the presence of 1.05 to 1.15 molar equivalents of acetic anhydride with respect to the total hydroxyl groups of the monomer, based on 100 mol % of the total amount of the monomers for providing structural units (I) (IV) as needed.

When the polymerization reaction is carried out in 2 steps of melt polymerization and the subsequent solid phase polymerization, a known solid phase polymerization method, for example, a method of performing heat treatment of the prepolymer resin in a temperature range of 200° C. to 350° C. for 1 to 30 hours under an inert atmosphere of nitrogen or the like or under vacuum, is preferably selected after the prepolymer obtained by melt polymerization is cooled and solidified and then ground into powder or flakes. The solid phase polymerization may be carried out while stirring or may be carried out in a standing state without stirring. In the present invention, the enthalpy $\Delta H_1$ i.e., an index of the crystallinity of the resin molded article can be adjusted by changing the polymerization conditions (temperature and time) of the polymerization reaction.

A catalyst may or may not be used in the polymerization reaction. The catalyst to be used may be those conventionally used as a polymerization catalyst of polyester, including metal salt catalysts such as magnesium acetate, stannous acetate, tetrabutyl titanate, lead acetate, sodium acetate, potassium acetate, antimony pentoxide, organic compound catalysts such as nitrogen-containing heterocyclic compounds such as N-methylimidazole, and the like. The amount of the catalyst to be used is not particularly limited and is preferably 0.0001 to 0.1 parts by weight per 100 parts by weight of the total amount of monomers.

The polymerization reactor in the melt polymerization is not particularly limited, and a reactor used for the reaction of a general high-viscosity fluid is preferably used. Examples of these reaction apparatuses include, for example, an anchor-type, a multistage type, a spiral band-type, a spiral shaft-type, or stirring vessel type polymerization reaction apparatus having stirring apparatus with stirring blades in various shapes obtained by deforming these, or a mixing apparatus such as a kneader, a roll mill, a Banbury mixer, which is generally used for kneading resins.
(Other Ingredients)

The molded article according to the present invention may contain a resin other than the wholly aromatic liquid crystalline polyester resin to the extent that the effect of the present invention is not impaired. Examples include polyester resins such as polyethylene terephthalate, polyethylene naphthalate, polyarylate, and polybutylene terephthalate, polyolefin resins such as polyethylene and polypropylene, cycloolefin polymers, vinyl resins such as polyvinyl chloride, (meth)acrylic resins such as polyacrylate, polymethacrylate and polymethyl methacrylate, polyphenylene ether resins, polyacetal resins, polyamide resins, imide resins such as polyimide and polyetherimide, polystyrene resins such as polystyrene, high-impact polystyrene, AS resins and ABS resins, thermosetting resins such as epoxy resins, cellulose resins, polyether ether ketone resins, fluorine resins and polycarbonate resins, and the like, and the molded article may contain 1 or 2 or more of these resins.

The molded article according to the present invention may contain other additives, for example, colorants, dispersants, plasticizers, antioxidants, curing agents, flame retardants, heat stabilizers, ultraviolet absorbers, antistatic agents, and surfactants, to the extent that the effect of the present invention is not impaired.
(Method for Producing Resin Molded Article)

The resin molded article according to the present invention can be obtained by molding a resin composition containing the above-mentioned wholly aromatic liquid crystalline polyester resin and other resins, additives and the like, as needed, by a conventionally known method, followed by heat treatment (annealing). The resin composition can be obtained by melt kneading wholly aromatic liquid crystalline polyester resins or the like using a Banbury mixer, a kneader, a single or two screw extruder or the like.

Examples of the molding method include press molding, foam molding, injection molding, extrusion molding, and punching molding. The molded article produced as described above can be processed into various shapes depending on the application. The shape of the molded article can be, for example, a plate or a film.

The lower limit of the temperature of heat treatment (annealing) is preferably "$Tm_2-50°$ C." or higher, more preferably "$Tm_2-40°$ C." or higher, more preferably "$Tm_2-30°$ C." or higher, and still preferably "$Tm_2-20°$ C." or higher and the upper limit is preferably "$Tm_2+10°$ C." or lower, more preferably "$Tm_2+5°$ C." or lower, still preferably "$Tm_2$" or lower, and still more preferably "$Tm_2-5°$ C." or lower. Further, for example, the lower limit of heat treatment time is preferably 30 minutes or more, 1 hour or more, and more preferably 2 hours or more, and the upper limit is preferably 10 hours or less and more preferably 5 hours or less. The atmosphere during heating is preferably under air atmosphere, more preferably under a reduced pressure atmosphere, and still more preferably a nitrogen atmosphere. If the temperature, time, and atmosphere of heat treatment are within the above ranges, the enthalpy $\Delta H_1$, i.e. an index of the crystallinity above, can be easily adjusted to a desired range, and the occurrence of blisters and a warpage on the surface of the molded article can be suppressed.
(Electric and Electronic Component)

An electrical and electronic component according to the present invention comprises the resin molded article above. Examples of the electrical and electronic components include antennas used in electronic and telecommunication equipment such as ETC, GPS, wireless LAN, and mobile phones, high-speed transmission connectors, CPU sockets, circuit boards, flexible printed boards (FPC), laminate circuit boards, millimeter wave and quasi-millimeter wave radars such as collision prevention radars, RFID tags, condensers, inverter components, insulating films, coating materials for cables, insulating materials for secondary batteries such as lithium ion batteries, speaker diaphragms, and the like.

EXAMPLES

Hereinafter, the present invention will be described more specifically with reference to the Examples; however the present invention is not limited to the Examples.

[Test Example 1] Examination of Change in Dielectric Properties by Heat Treatment In Test Example 1, changes in the dielectric properties of the heat treated resin molded articles were confirmed using the wholly aromatic liquid crystalline polyester resins of various monomer compositions.

Example 1-1

<Production of Wholly Aromatic Liquid Crystalline Polyester Resin>

To a polymerization vessel having a stirring blade were added, 48 mol % of 6-hydroxy-2-naphthoic acid (HNA), 23.5 mol % of 4,4-dihydroxybiphenyl (BP), 23.5 mol % of terephthalic acid (TPA), and 5 mol % of p-hydroxybenzoic acid (HBA) and potassium acetate and magnesium acetate were charged as catalysts, nitrogen substitution was carried out by performing 3 times of pressure reduction-nitrogen injection of the polymerization vessel, and subsequently, acetic anhydride (1.08 mol equivalents with respect to the hydroxyl group) was further added, the temperature was raised to 150° C., and acetylation reaction was carried out for 2 hours under reflux.

After completion of acetylation, the polymerization vessel in the acetic add distillation state was heated at 0.5° C./min, and when the melt temperature in the vessel reached 307° C., the polymer was extracted and solidified by cooling. The obtained polymer was ground to a size that passed through a sieve having an opening of 2.0 mm to obtain a prepolymer.

Next, the prepolymer obtained as described above was heated from room temperature to 300° C. by a heater in an oven manufactured by Yamato Kagaku Co., Ltd. for 14 hours, and then solid phase polymerization was carried out at 300° C. for 2 hours. Thereafter, the mixture was naturally heat released under room temperature to obtain a wholly aromatic liquid crystalline polyester resin. Using a polarizing microscope (product name: BH-2) manufactured by Olympus Corporation equipped with a hot stage (product name: FP82HT) for a microscope manufactured by Mettler, a sample of a wholly aromatic liquid crystalline polyester resin was heated and melted on a microscope heating stage, and liquid crystallinity was confirmed from the presence or absence of optical anisotropy.

<Production of Resin Molded Article>

The wholly aromatic liquid crystalline polyester resin obtained above was heated and melted at a condition of from the melting point to the temperature of melting point+30° C. and injection molded to prepare a flat plate test piece of 30 mm×30 mm×0.4 mm. The obtained flat plate test piece was subjected to heat treatment at 315° C. for 3 hours using an inert oven DN411I manufactured by Yamato Kagaku Co., Ltd. under a nitrogen flow of 30 L/min.

Example 1-2

A wholly aromatic liquid crystalline polyester resin was obtained in the same manner as in Example 1-1, except that the monomer charge was changed to 45 mol % of HNA, 27.5 mol % of BP, 19.5 mol % of TPA, and 8 mol % of 2,6-naphthalenedicarboxylic add (NADA). Subsequently, the liquid crystallinity of the obtained wholly aromatic liquid crystalline polyester resin was confirmed in the same manner as described above.

Using the wholly aromatic liquid crystalline polyester resin obtained above, a flat plate test piece was prepared in the same manner as in Example 1-1. Subsequently, the obtained flat plate test piece was heat-treated at 300° C. for 3 hours to obtain a heat-treated resin molded article.

Example 1-3

Monomer charge was changed to 50 mol % of HNA, 25 mol % of BP, and 25 mol % of NADA, acetylation was carried out in the same manner as in Example 1-1, and then the temperature was raised to 360° C. over 5 hours and 30 minutes. Thereafter, the pressure was reduced to 10 torr over 20 minutes, and the polymer was extracted and solidified by cooling. The obtained polymer was ground to a size that passed through a sieve having an opening of 2.0 mm, and the liquid crystallinity of the wholly aromatic polyester resin obtained without solid phase polymerization was confirmed.

Using the wholly aromatic liquid crystalline polyester resin obtained above, a flat plate test piece was prepared in the same manner as in Example 1-1. Subsequently, the obtained flat plate test piece was heat-treated at 300° C. for 3 hours to obtain a heat-treated resin molded article.

Example 1-4

A wholly aromatic liquid crystalline polyester resin was obtained in the same manner as in Example 1-1, except that the monomer charge was changed to 50 mol % of HNA, 25 mol % of BP, 22 mol % of TPA, and 3 mol % of NADA, and the final temperature of the solid phase polymerization was set to 310° C. and the holding time was set to 1 hours. Subsequently, the liquid crystallinity of the obtained wholly aromatic liquid crystalline polyester resin was confirmed in the same manner as described above.

Using the wholly aromatic liquid crystalline polyester resin obtained above, a flat plate test piece was prepared in the same manner as in Example 1-1. Subsequently, the obtained flat plate test piece was heat-treated at 320° C. for 3 hours to obtain a heat-treated resin molded article.

Example 1-5

A wholly aromatic liquid crystalline polyester resin was obtained in the same manner as in Example 1-1, except that the monomer charge was changed to 50 mol % of HNA, 20 mol % of BP, 5 mol % of hydroquinone (HQ), 20.5 mol % of TPA, and 4.5 mol % of NADA. Subsequently, the liquid crystallinity of the obtained wholly aromatic liquid crystalline polyester resin was confirmed in the same manner as described above.

Using the wholly aromatic liquid crystalline polyester resin obtained above, a flat plate test piece was prepared in the same manner as in Example 1-1. Subsequently, the obtained flat plate test piece was heat-treated at 285° C. for 3 hours to obtain a heat-treated resin molded article.

Example 1-6

A wholly aromatic liquid crystalline polyester resin was obtained in the same manner as in Example 1-1, except that the monomer charge was changed to 50 mol % of HNA, 25 mol % of BP, 19 mol % of TPA, and 6 mol % of NADA. Subsequently, the liquid crystallinity of the obtained wholly aromatic liquid crystalline polyester resin was confirmed in the same manner as described above.

Using the wholly aromatic liquid crystalline polyester resin obtained above, a flat plate test piece was prepared in the same manner as in Example 1-1. Subsequently, the obtained flat plate test piece was heat-treated at 305° C. for 3 hours to obtain a heat-treated resin molded article.

Example 1-7

A wholly aromatic liquid crystalline polyester resin was obtained in the same manner as in Example 1-1, except that the monomer charge was changed to 50 mol % of HNA, 25 mol % of BP, 17 mol % of TPA, and 8 mol % of NADA. Subsequently, the liquid crystallinity of the obtained wholly aromatic liquid crystalline polyester resin was confirmed in the same manner as described above.

Using the wholly aromatic liquid crystalline polyester resin obtained above, a flat plate test piece was prepared in the same manner as in Example 1-1. Subsequently, the obtained flat plate test piece was heat-treated at 290° C. for 3 hours to obtain a heat-treated resin molded article.

Example 1-8

A wholly aromatic liquid crystalline polyester resin was obtained in the same manner as in Example 1-1, except that the monomer charge was changed to 50 mol % of HNA, 25 mol % of BP, 15 mol % of TPA, 2 mol % of IPA, and 8 mol % of NADA. Subsequently, the liquid crystallinity of the obtained wholly aromatic liquid crystalline polyester resin was confirmed in the same manner as described above.

Using the wholly aromatic liquid crystalline polyester resin obtained above, a flat plate test piece was prepared in the same manner as in Example 1-1. Subsequently, the obtained flat plate test piece was heat-treated at 280° C. for 3 hours to obtain a heat-treated resin molded article.

Example 1-9

A wholly aromatic liquid crystalline polyester resin was obtained in the same manner as in Example 1-1, except that the monomer charge was changed to 50 mol % of HNA, 24 mol % of BP, 1 mol % of 4,4'-isopropylidenediphenol (BisPA), 20.5 mol % of TPA, and 4.5 mol % of NADA, and the final temperature of the solid-phase polymerization was 300° C. and the holding time was 1 hour. Subsequently, the liquid crystallinity of the obtained wholly aromatic liquid crystalline polyester resin was confirmed in the same manner as described above.

Using the wholly aromatic liquid crystalline polyester resin obtained above, a flat plate test piece was prepared in the same manner as in Example 1-1. Subsequently, the obtained flat plate test piece was heat-treated at 305° C. for 3 hours to obtain a heat-treated resin molded article.

Example 1-10

A wholly aromatic liquid crystalline polyester resin was obtained in the same manner as in Example 1-1, except that the monomer charge was changed to 50 mol % of HNA, 23 mol % of BP, 2 mol % of BisPA, 20.5 mol % of TPA, and 4.5 mol % of NADA, and the final temperature of the solid-phase polymerization was 300° C. and the holding time was 1 hour. Subsequently, the liquid crystallinity of the obtained wholly aromatic liquid crystalline polyester resin was confirmed in the same manner as described above.

Using the wholly aromatic liquid crystalline polyester resin obtained above, a flat plate test piece was prepared in the same manner as in Example 1-1. Subsequently, the obtained flat plate test piece was heat-treated at 300° C. for 3 hours to obtain a heat-treated resin molded article.

Example 1-11

A wholly aromatic liquid crystalline polyester resin was obtained in the same manner as in Example 1-1, except that the monomer charge was changed to 52 mol % of HNA, 24 mol % of BR 18 mol % of TPA, 3 mol % of IPA, and 3 mol % of NADA. Subsequently, the liquid crystallinity of the obtained wholly aromatic liquid crystalline polyester resin was confirmed in the same manner as described above.

Using the wholly aromatic liquid crystalline polyester resin obtained above, a flat plate test piece was prepared in the same manner as in Example 1-1. Subsequently, the obtained flat plate test piece was heat-treated at 305° C. for 3 hours to obtain a heat-treated resin molded article.

Example 1-12

A wholly aromatic liquid crystalline polyester resin was obtained in the same manner as in Example 1-1, except that the monomer charge was changed to 55 mol % of HNA, 22.5 mol % of BP, 18 mol % of TPA, and 4.5 mol % of NADA. Subsequently, the liquid crystallinity of the obtained wholly aromatic liquid crystalline polyester resin was confirmed in the same manner as described above.

Using the wholly aromatic liquid crystalline polyester resin obtained above, a flat plate test piece was prepared in the same manner as in Example 1-1. Subsequently, the obtained flat plate test piece was heat-treated at 305° C. for 3 hours to obtain a heat-treated resin molded article.

Example 1-13

A wholly aromatic liquid crystalline polyester resin was obtained in the same manner as in Example 1-1, except that the monomer charge was changed to 55 mol % of HNA, 22.5 mol % of BP, 18 mol % of TPA, 2 mol % of isophthalic acid (IPA), and 2.5 mol % of NADA. Subsequently, the liquid crystallinity of the obtained wholly aromatic liquid crystalline polyester resin was confirmed in the same manner as described above.

Using the wholly aromatic liquid crystalline polyester resin obtained above, a flat plate test piece was prepared in the same manner as in Example 1-1. Subsequently, the obtained flat plate test piece was heat-treated at 310° C. for 3 hours to obtain a heat-treated resin molded article.

Example 1-14

A wholly aromatic liquid crystalline polyester resin was obtained in the same manner as in Example 1-1, except that the monomer charge was changed to 55 mol % of HNA, 20 mol % of BP, 20 mol % of TPA, and 5 mol % of HBA. Subsequently, the liquid crystallinity of the obtained wholly aromatic liquid crystalline polyester resin was confirmed in the same manner as described above.

Using the wholly aromatic liquid crystalline polyester resin obtained above, a flat plate test piece was prepared in the same manner as in Example 1-1. Subsequently, the obtained flat plate test piece was heat-treated at 315° C. for 3 hours to obtain a heat-treated resin molded article.

Example 1-15

A wholly aromatic liquid crystalline polyester resin was obtained in the same manner as in Example 1-1, except that the monomer charge was changed to 60 mol % of HNA, 20 mol % of BP, 17 mol % of TPA and 3 mol % of NADA, the final temperature of the solid phase polymerization was set to 295° C., and the holding time was set to 1 hour. Subsequently, the liquid crystallinity of the obtained wholly aromatic liquid crystalline polyester resin was confirmed in the same manner as described above.

Using the wholly aromatic liquid crystalline polyester resin obtained above, a flat plate test piece was prepared in the same manner as in Example 1-1. Subsequently, the obtained flat plate test piece was heat-treated at 315° C. for 3 hours to obtain a heat-treated resin molded article.

Example 1-16

A wholly aromatic liquid crystalline polyester resin was obtained in the same manner as in Example 1-1, except that the monomer charge was changed to 60 mol % of HNA, 20 mol % of BP, 15.5 mol % of TPA and 4.5 mol % of NADA, the final temperature of the solid phase polymerization was set to 295° C., and the holding time was set to 1.5 hours. Subsequently, the liquid crystallinity of the obtained wholly aromatic liquid crystalline polyester resin was confirmed in the same manner as described above.

Using the wholly aromatic liquid crystalline polyester resin obtained above, a flat plate test piece was prepared in the same manner as in Example 1-1. Subsequently, the obtained flat plate test piece was heat-treated at 300° C. for 3 hours to obtain a heat-treated resin molded article.

Example 1-17

A wholly aromatic liquid crystalline polyester resin was obtained in the same manner as in Example 1-1, except that the monomer charge was changed to 60 mol % of HNA, 20 mol % of BP, 15.5 mol % of TPA and 4.5 mol % of NADA, the final temperature of the solid phase polymerization was set to 310° C. and the holding time was set to 1 hour. Subsequently, the liquid crystallinity of the obtained wholly aromatic liquid crystalline polyester resin was confirmed in the same manner as described above.

Using the wholly aromatic liquid crystalline polyester resin obtained above, a flat plate test piece was prepared in the same manner as in Example 1-1. Subsequently, the obtained flat plate test piece was heat-treated at 300° C. for 3 hours to obtain a heat-treated resin molded article.

Example 1-18

A wholly aromatic liquid crystalline polyester resin was obtained in the same manner as in Example 1-1, except that the monomer charge was changed to 60 mol % of HNA, 20 mol % of BP, 15.5 mol % of TPA and 4.5 mol % of NADA, the final temperature of the solid phase polymerization was set to 310° C., and the holding time was set to 4 hours. Subsequently, the liquid crystallinity of the obtained wholly aromatic liquid crystalline polyester resin was confirmed in the same manner as described above.

Using the wholly aromatic liquid crystalline polyester resin obtained above, a flat plate test piece was prepared in the same manner as in Example 1-1. Subsequently, the obtained flat plate test piece was heat-treated at 300° C. for 3 hours to obtain a heat-treated resin molded article.

Example 1-19

A wholly aromatic liquid crystalline polyester resin was obtained in the same manner as in Example 1-1, except that the monomer charge was changed to 60 mol % of HNA, 20 mol % of BP, 11 mol % of TPA, and 9 mol % of NADA. Subsequently, the liquid crystallinity of the obtained wholly aromatic liquid crystalline polyester resin was confirmed in the same manner as described above.

Using the wholly aromatic liquid crystalline polyester resin obtained above, a flat plate test piece was prepared in the same manner as in Example 1-1. Subsequently, the obtained flat plate test piece was heat-treated at 290° C. for 3 hours to obtain a heat-treated resin molded article.

Example 1-20

A wholly aromatic liquid crystalline polyester resin was obtained in the same manner as in Example 1-1, except that the monomer charge was changed to 65 mol % of HNA, 17.5 mol % of BP, 8.5 mol % of TPA, and 9 mol % of NADA. Subsequently, the liquid crystallinity of the obtained wholly aromatic liquid crystalline polyester resin was confirmed in the same manner as described above.

Using the wholly aromatic liquid crystalline polyester resin obtained above, a flat plate test piece was prepared in the same manner as in Example 1-1. Subsequently, the obtained flat plate test piece was heat-treated at 290° C. for 3 hours to obtain a heat-treated resin molded article.

Example 1-21

A wholly aromatic liquid crystalline polyester resin was obtained in the same manner as in Example 1-1, except that the monomer charge was changed to 65 mol % of HNA, 14.5 mol % of BP, 2 mol % of methyl hydroquinone (MeHQ), 16.5 mol % of TPA, and 2 mol % of HBA, the final temperature of the solid phase polymerization was set to 295° C., and the holding time was set to 1 hour. Subsequently, the liquid crystallinity of the obtained wholly aromatic liquid crystalline polyester resin was confirmed in the same manner as described above.

Using the wholly aromatic liquid crystalline polyester resin obtained above, a flat plate test piece was prepared in the same manner as in Example 1-1. Subsequently, the obtained flat plate test piece was heat-treated at 300° C. for 3 hours to obtain a heat-treated resin molded article.

Example 1-22

A wholly aromatic liquid crystalline polyester resin was obtained in the same manner as in Example 1-1, except that the monomer charge was changed to 65 mol % of HNA, 15 mol % of BP, 15 mol % of TPA, and 5 mol % of HBA, the final temperature of the solid phase polymerization was set to 300° C., and the holding time was set to 1 hour. Subsequently, the liquid crystallinity of the obtained wholly aromatic liquid crystalline polyester resin was confirmed in the same manner as described above.

Using the wholly aromatic liquid crystalline polyester resin obtained above, a flat plate test piece was prepared in the same manner as in Example 1-1. Subsequently, the obtained flat plate test piece was heat-treated at 310° C. for 3 hours to obtain a heat-treated resin molded article.

Example 1-23

A wholly aromatic liquid crystalline polyester resin was obtained in the same manner as in Example 1-1, except that the monomer charge was changed to 70 mol % of HNA, 15 mol % of BP, 12 mol % of TPA, and 3 mol % of NADA. Subsequently, the liquid crystallinity of the obtained wholly aromatic liquid crystalline polyester resin was confirmed in the same manner as described above.

Using the wholly aromatic liquid crystalline polyester resin obtained above, a flat plate test piece was prepared in the same manner as in Example 1-1. Subsequently, the obtained flat plate test piece was heat-treated at 310° C. for 3 hours to obtain a heat-treated resin molded article.

Example 1-24

A wholly aromatic liquid crystalline polyester resin was obtained in the same manner as in Example 1-1, except that the monomer charge was changed to 55 mol % of HNA, 24.75 mol % of HQ (equivalent amount was 22.5 mol %, which was used in excess in consideration of loss due to monomer sublimation in the reaction), 5 mol % of TPA, and 17.5 mol % of NADA, the final temperature of the solid phase polymerization was set to 310° C., and the retention time was set to 1 hour. Subsequently, the liquid crystallinity of the obtained wholly aromatic liquid crystalline polyester resin was confirmed in the same manner as described above.

Using the wholly aromatic liquid crystalline polyester resin obtained above, a flat plate test piece was prepared in the same manner as in Example 1-1. Subsequently, the obtained flat plate test piece was heat-treated at 300° C. for 3 hours to obtain a heat-treated resin molded article.

Comparative Example 1-1

A wholly aromatic liquid crystalline polyester resin was obtained in the same manner as in Example 1-1, except that the monomer charge was changed to 20 mol % of BP, 15 mol % of TPA, 5 mol % of IPA, and 60 mol % of HBA. Subsequently, the liquid crystallinity of the obtained wholly aromatic liquid crystalline polyester resin was confirmed in the same manner as described above.

Using the wholly aromatic liquid crystalline polyester resin obtained above, a flat plate test piece was prepared in the same manner as in Example 1-1. Subsequently, the obtained flat plate test piece was heat-treated at 335° C. for 3 hours to obtain a heat-treated resin molded article.

Comparative Example 1-2

A wholly aromatic liquid crystalline polyester resin was obtained in the same manner as in Example 1-1, except that the monomer charge was changed to 27 mol % of HNA and 73 mol % of HBA, the final temperature of the solid phase polymerization was set to 270° C., and the holding time was set to 1 hour. Subsequently, the liquid crystallinity of the obtained wholly aromatic liquid crystalline polyester resin was confirmed in the same manner as described above.

Using the wholly aromatic liquid crystalline polyester resin obtained above, a flat plate test piece was prepared in the same manner as in Example 1-1. Subsequently, the obtained flat plate test piece was heat-treated at 270° C. for 3 hours to obtain a heat-treated resin molded article.

Comparative Example 1-3

A wholly aromatic liquid crystalline polyester resin was obtained in the same manner as in Example 1-1, except that the monomer charge was changed to 10 mol % of HNA, 10 mol % of BP, 15 mol % of HQ, 25 mol % of TPA, and 40 mol % of HBA, the final temperature of the solid phase polymerization was set to 280° C., and the holding time was set to 1 hour. Subsequently, the liquid crystallinity of the obtained wholly aromatic liquid crystalline polyester resin was confirmed in the same manner as described above.

Using the wholly aromatic liquid crystalline polyester resin obtained above, a flat plate test piece was prepared in the same manner as in Example 1-1. Subsequently, the obtained flat plate test piece was heat-treated at 280° C. for 3 hours to obtain a heat-treated resin molded article.

The monomer compositions and the heat treatment conditions of the wholly aromatic liquid crystalline polyester resins of the resin molded article s produced in the above Examples and Comparative Examples are listed in Table 1.

TABLE 1

| | Composition (mol %) | | | | | | | | Heat treatment of |
|---|---|---|---|---|---|---|---|---|---|
| | Structural Unit (I) | Structural Unit (II) | | | Structural Unit (III) | | | Structural Unit (IV) | resin molded article (annealing |
| | HNA | BP | HQ | MeHQ | BisPA | TPA | IPA | NADA | HBA | temperature (° C.)) |
| Example 1-1 | 48 | 23.5 | | | | 23.5 | | | 5 | 315 |
| Example 1-2 | 45 | 27.5 | | | | 19.5 | | 8 | | 300 |
| Example 1-3 | 50 | 25 | | | | | | 25 | | 300 |
| Example 1-4 | 50 | 25 | | | | 22 | | 3 | | 320 |
| Example 1-5 | 50 | 20 | 5 | | | 20.5 | | 4.5 | | 285 |
| Example 1-6 | 50 | 25 | | | | 19 | | 6 | | 305 |
| Example 1-7 | 50 | 25 | | | | 17 | | 8 | | 290 |
| Example 1-8 | 50 | 25 | | | | 15 | 2 | 8 | | 280 |
| Example 1-9 | 50 | 24 | | 1 | | 20.5 | | 4.5 | | 305 |
| Example 1-10 | 50 | 23 | | 2 | | 20.5 | | 4.5 | | 300 |
| Example 1-11 | 52 | 24 | | | | 18 | 3 | 3 | | 305 |
| Example 1-12 | 55 | 22.5 | | | | 18 | | 4.5 | | 305 |
| Example 1-13 | 55 | 22.5 | | | | 18 | 2 | 2.5 | | 310 |
| Example 1-14 | 55 | 20 | | | | 20 | | | 5 | 315 |
| Example 1-15 | 60 | 20 | | | | 17 | | 3 | | 315 |
| Example 1-16 | 60 | 20 | | | | 15.5 | | 4.5 | | 300 |
| Example 1-17 | 60 | 20 | | | | 15.5 | | 4.5 | | 300 |
| Example 1-18 | 60 | 20 | | | | 15.5 | | 4.5 | | 300 |
| Example 1-19 | 60 | 20 | | | | 11 | | 9 | | 290 |
| Example 1-20 | 65 | 17.5 | | | | 8.5 | | 9 | | 290 |
| Example 1-21 | 65 | 14.5 | | 2 | | 16.5 | | | 2 | 300 |
| Example 1-22 | 65 | 15 | | | | 15 | | | 5 | 310 |
| Example 1-23 | 70 | 15 | | | | 12 | | 3 | | 310 |
| Example 1-24 | 55 | | 22.5 | | | 5 | | 17.5 | | 300 |
| Comp. Ex 1-1 | | 20 | | | | 15 | 5 | | 60 | 335 |

TABLE 1-continued

| | Composition (mol %) | | | | | | | | | Heat treatment of resin molded article (annealing temperature (° C.)) |
|---|---|---|---|---|---|---|---|---|---|---|
| | Structural Unit (I) | Structural Unit (II) | | | Structural Unit (III) | | | Structural Unit (IV) | | |
| | HNA | BP | HQ | MeHQ | BisPA | TPA | IPA | NADA | HBA | |
| Comp. Ex 1-2 | 27 | | | | | | | | 73 | 270 |
| Comp. Ex 1-3 | 10 | 10 | 15 | | | 25 | | | 40 | 280 |

<Performance Evaluation>
<Differential Scanning calorimetry (DSC)>

The heat-treated resin molded articles obtained in Examples and Comparative Examples were subjected to differential scanning calorimetry under the following conditions. In the measurement, the corner on the side opposite to the resin inflow portion at the time of injection molding of the heat-treated molded article was cut out to about 2 mm square and used as a sample. The enthalpy changes $\Delta H_1$ and $\Delta H_2$ at the melting points of the first and second cycles of the temperature elevation process were measured. The temperature at the vertex of the endothermic peak in the first and the second cycles of the temperature elevation process were defined as $Tm_1$ and $Tm_2$, respectively, and $Tm_2$ was defined as the melting point (° C.).
Measurement conditions: two cycles were carried out in which one cycle consisted of a process of elevating the temperature at a temperature elevation rate of 10° C./min from 30° C. to 360-380° C. a process of decreasing the temperature at a temperature decreasing rate of 10° C./rain from 360-380° C. to 30° C.
<Dielectric Loss Tangent Measurement (10 GHz)>

Each of the plate-shaped test pieces before heat treatment and the heat-treated resin-molded articles obtained in the Examples and Comparative Examples described above were measured for the dielectric loss tangent in the in-plane direction at a frequency of 10 GHz, by the split post dielectric resonator method (SPDR method) using a network analyzer N5247A from Keysight Technologies Co., Ltd. Each type of the samples was measured at N=4, and the average values of the 4 measurements are shown in Table 2.

When the resin molded article was used to prepare a circuit board, the dielectric loss in the circuit board can be obtained by the following formula according to the description in a technical literature (Development and Application of Polymer Materials for High Frequencies, CMC Technical Library 201, Bunmei Baba, editorial supervisor, p. 120).

$$a_D = 27.3 \times (f/C) \times (Er)^{1/2} \times \tan \delta$$

$a_D$: dielectric loss (dB/m)
f: frequency (Hz)
C: speed of light
Er: relative permittivity
tan δ: dielectric loss tangent According to this formula, by comparing the values of $(Er)^{1/2} \times \tan \delta$ at a certain frequency among the materials, it is possible to know the degree of reduction in the dielectric loss for each material. Therefore, the values of the relative permittivity Er of each molded article is shown in Table 2.
<Melt Viscosity Measurement>

The wholly aromatic liquid crystalline polyester resins obtained in the above Examples and Comparative Examples were measured for the melt viscosity (Pa·s) at the temperature of melting point+20° C. at a shear rate of 1000 $S^{-1}$ in accordance with JIS K7199 using a capillary rheometer (Toyo Seiki Seisaku-sho, Ltd., Capilograph 1D) and capillaries having an inner diameter of 1 mm. The measurement results are shown in Table 2. Note that, the wholly aromatic liquid crystalline polyester resins were dried at 150° C. for 4 hours under reduced pressure before the measurement.

TABLE 2

| | Differential Scanning Calorimetry (DSC) | | | | | Dielectric Loss Parameter | | | | Melt viscosity (Pa · s) |
|---|---|---|---|---|---|---|---|---|---|---|
| | | | | | | Before heat treatment | | After heat treatment | | |
| | $\Delta H_1$ (J/g) | $\Delta H_2$ (J/g) | $\Delta H_1/\Delta H_2$ | $Tm_1$ (° C.) | $Tm_2$ (° C.) | Relative permittivity Er | dielectric loss tangent tanδ ($\times 10^{-3}$) | Relative permittivity Er | dielectric loss tangent tanδ ($\times 10^{-3}$) | |
| Example 1-1 | 9.0 | 1.3 | 6.9 | 340 | 333 | 3.5 | 0.83 | 3.5 | 0.59 | 20 |
| Example 1-2 | 9.3 | 1.1 | 8.5 | 322 | 321 | 3.5 | 0.73 | 3.5 | 0.54 | 37 |
| Example 1-3 | 14.5 | 3.9 | 3.7 | 326 | 326 | 3.6 | 1.46 | 3.6 | 0.85 | 0.5 |
| Example 1-4 | 11.4 | 1.4 | 8.1 | 343 | 337 | 3.5 | 0.71 | 3.5 | 0.50 | 42 |
| Example 1-5 | 4.5 | 1.2 | 3.8 | 307 | 304 | 3.6 | 0.69 | 3.5 | 0.62 | 30 |
| Example 1-6 | 9.7 | 1.2 | 8.1 | 328 | 322 | 3.5 | 0.71 | 3.6 | 0.52 | 35 |
| Example 1-7 | 9.6 | 2.6 | 3.7 | 307 | 312 | 3.6 | 0.67 | 3.5 | 0.53 | 53 |
| Example 1-8 | 9.2 | 1.7 | 5.4 | 300 | 301 | 3.6 | 0.69 | 3.6 | 0.64 | 99 |
| Example 1-9 | 10.9 | 1.8 | 6.1 | 329 | 325 | 3.5 | 0.88 | 3.6 | 0.66 | 12 |
| Example 1-10 | 10.4 | 0.6 | 17.3 | 330 | 320 | 3.5 | 0.91 | 3.5 | 0.73 | 80 |
| Example 1-11 | 9.1 | 1.6 | 5.7 | 331 | 324 | 3.5 | 0.69 | 3.6 | 0.61 | 86 |
| Example 1-12 | 11.1 | 1.7 | 6.5 | 326 | 325 | 3.6 | 0.68 | 3.6 | 0.49 | 60 |
| Example 1-13 | 10.8 | 1.0 | 10.8 | 333 | 330 | 3.6 | 0.70 | 3.6 | 0.48 | 55 |
| Example 1-14 | 11.0 | 1.3 | 8.5 | 338 | 336 | 3.6 | 0.70 | 3.5 | 0.48 | 41 |
| Example 1-15 | 15.2 | 3.9 | 3.9 | 339 | 339 | 3.6 | 0.83 | 3.6 | 0.50 | 28 |
| Example 1-16 | 11.3 | 1.5 | 7.5 | 323 | 321 | 3.5 | 0.71 | 3.6 | 0.48 | 21 |

TABLE 2-continued

|  | Differential Scanning Calorimetry (DSC) | | | | | Dielectric Loss Parameter | | | | |
| --- | --- | --- | --- | --- | --- | --- | --- | --- | --- | --- |
|  | | | | | | Before heat treatment | | After heat treatment | | |
|  | $\Delta H_1$ (J/g) | $\Delta H_2$ (J/g) | $\Delta H_1/\Delta H_2$ | $Tm_1$ (° C.) | $Tm_2$ (° C.) | Relative permittivity Er | dielectric loss tangent tanδ (×10⁻³) | Relative permittivity Er | dielectric loss tangent tanδ (×10⁻³) | Melt viscosity (Pa · s) |
| Example 1-17 | 10.0 | 1.0 | 10.0 | 323 | 321 | 3.5 | 0.60 | 3.6 | 0.46 | 91 |
| Example 1-18 | 7.7 | 0.4 | 19.3 | 322 | 320 | 3.5 | 0.54 | 3.5 | 0.47 | 172 |
| Example 1-19 | 8.6 | 1.9 | 4.5 | 310 | 308 | 3.6 | 0.65 | 3.6 | 0.52 | 31 |
| Example 1-20 | 8.4 | 1.0 | 8.4 | 310 | 313 | 3.6 | 0.56 | 3.6 | 0.45 | 83 |
| Example 1-21 | 8.7 | 1.2 | 7.3 | 328 | 322 | 3.6 | 0.68 | 3.6 | 0.53 | 58 |
| Example 1-22 | 8.9 | 1.0 | 8.9 | 321 | 316 | 3.6 | 0.70 | 3.6 | 0.49 | 52 |
| Example 1-23 | 11.4 | 0.8 | 14.3 | 332 | 333 | 3.6 | 0.55 | 3.6 | 0.39 | 48 |
| Example 1-24 | 3.8 | 1.0 | 3.8 | 321 | 317 | 3.6 | 1.46 | 3.6 | 0.54 | 67 |
| Comp. Ex 1-1 | 4.3 | 1.0 | 4.3 | 381 | 358 | 3.5 | 2.24 | 3.5 | 2.05 | 32 |
| Comp. Ex 1-2 | 4.1 | 1.0 | 4.1 | 306 | 294 | 3.5 | 1.70 | 3.5 | 1.51 | 73 |
| Comp. Ex 1-3 | 4.4 | 1.4 | 6.9 | 305 | 308 | 3.4 | 2.67 | 3.4 | 2.00 | 6 |

[Test Example 2] Study of Dielectric Properties for Heat Treatment Conditions

In Test Example 2, a change in dielectric properties of the resin molded articles having the specific composition with respect to the heat treatment conditions was confirmed.

Generally, in the heat treatment of a resin molded article, the molded article exhibits a warpage due to the influence of residual stress at the time of molding and a blister on the surface of the product due to the generation of gas, possibly causing defects as a product. On the other hand, by use of the resin molded article according to the present invention, it is possible to obtain a non-defective heat-treated molded article having an excellent low dielectric property under a wide range of heat treatment conditions.

<Production of Resin Molded Article>

Example 2-1

The plate-shaped test piece obtained in Example 1-16 was heat-treated at 280° C. for 3 hours to obtain the heat-treated resin molded article.

Example 2-2

The plate-shaped test piece obtained in Example 1-16 was heat-treated at 325° C. for 4 hours to obtain the heat-treated resin molded article. In addition, as a result of visual observation of the surface of the obtained resin molded article, no blister or warpage were occurring.

Example 2-3

The plate-shaped test piece obtained in Example 1-23 was heat-treated at 290° C. for 3 hours to obtain the heat-treated resin molded article.

Example 2-4

The plate-shaped test piece obtained in Example 1-23 was heat-treated at 335° C. for 4 hours to obtain the heat-treated resin molded article. In addition, as a result of visual observation of the surface of the obtained resin molded articles, no blister or warpage was occurring.

Comparative Example 2-1

The plate-shaped piece obtained in Comparative Example 1-1 was heat-treated at 315° C. for 3 hours to obtain a heat-treated resin molded article.

Comparative Example 2-2

The plate-shaped test piece obtained in Comparative Example 1-1 was heat-treated at 360° C. for 4 hours to obtain a heat-treated resin molded article. In addition, as a result of visual observation of the surface of the obtained resin molded article, a blister was occurring.

Comparative Example 2-3

The plate-shaped test piece obtained in Comparative Example 1-2 was heat-treated at 250° C. for 3 hours to obtain a heat-treated resin molded article.

Comparative Example 2-4

The plate-shaped test piece obtained in Comparative Example 1-2 was heat-treated at 295° C. for 4 hours to obtain a heat-treated resin molded article. Further, as a result of visual observation of the surface of the obtained resin molded article, a blister and a warpage were occurring.

Comparative Example 2-5

The plate-shaped test piece obtained in Comparative Example 1-3 was heat-treated at 260° C. for 3 hours to obtain a heat-treated resin molded article.

<Performance Evaluation>

The heat-treated resin molded articles obtained in the above Examples and Comparative Examples were measured for enthalpies $\Delta H_1$ and $\Delta H_2$ and temperatures $Tm_1$ and $Tm_2$ in the same manner as in Test Example 1. Similarly to Test Example 1, the dielectric properties at 10 GHz were measured for each type of samples by N=4, and the average value of the 4 measurements are shown in Table 3. The measurement results of Examples 1-16 and 1-23 and Comparative Examples 1-1 to 1-3 were also described for reference.

TABLE 3

| | Annealing Temperature (° C.) | Differential scanning calorimetry (DSC) | | | | | Dielectric loss parameter | |
|---|---|---|---|---|---|---|---|---|
| | | $\Delta H_1$ (J/g) | $\Delta H_2$ (J/g) | $\Delta H_1/\Delta H_2$ | $Tm_1$ (° C.) | $Tm_2$ (° C.) | Relative permittivity Er | Dielectric loss tangent tanδ ($\times 10^{-3}$) |
| Example 2-1 | 280 | 12.9 | 3.2 | 4.0 | 320 | 321 | 3.6 | 0.56 |
| Example 1-16 | 300 | 11.3 | 1.5 | 7.5 | 323 | 321 | 3.6 | 0.48 |
| Example 2-2 | 325 | 9.7 | 0.4 | 24.3 | 343 | 320 | 3.5 | 0.49 |
| Example 2-3 | 290 | 8.1 | 3.0 | 2.7 | 319 | 332 | 3.6 | 0.45 |
| Example 1-23 | 310 | 11.4 | 0.8 | 14.3 | 332 | 333 | 3.6 | 0.39 |
| Example 2-4 | 335 | 5.4 | 0.6 | 9.0 | 361 | 351 | 3.6 | 0.40 |
| Comp. Ex 2-1 | 315 | 8.8 | 0.7 | 12.6 | 363 | 364 | 3.6 | 2.16 |
| Comp. Ex 1-1 | 335 | 4.3 | 1.0 | 4.3 | 381 | 358 | 3.5 | 2.05 |
| Comp. Ex 2-2 | 360 | 4.6 | 4.3 | 1.1 | 395 | 357 | 3.4 | 2.09 |
| Comp. Ex 2-3 | 250 | 5.6 | 1.2 | 4.7 | 280 | 293 | 3.6 | 1.39 |
| Comp. Ex 1-2 | 270 | 4.1 | 1.0 | 4.1 | 306 | 294 | 3.5 | 1.51 |
| Comp. Ex 2-4 | 295 | 1.6 | 0.6 | 2.7 | 322 | 295 | 3.5 | 1.99 |
| Comp. Ex 2-5 | 260 | 5.1 | 2.2 | 2.3 | 280 | 298 | 3.4 | 2.12 |
| Comp. Ex 1-3 | 280 | 4.4 | 1.4 | 3.1 | 305 | 308 | 3.4 | 2.00 |

[Test Example 3] Examination of Resin Kneaded Product

In Test Example 3, a resin kneaded product using the resin of the present invention as a base material was confirmed to exhibit excellent dielectric properties as a heat-treated molded article.

<Production of Resin Molded Article>

Example 3-1

99 parts by mass of the wholly aromatic liquid crystalline polyester resin obtained in Example 1-16 and 1 part by mass of the wholly aromatic liquid crystalline polyester resin obtained in Comparative Example 1-2 were mixed in a powder state, and the mixture was subjected to two-axis kneading at 350° C., using Labo Plasto Micro manufactured by Toyo Seiki Seisaku-sho, Ltd., to obtain resin composition pellets. Using the obtained resin composition pellets, a flat plate test piece was prepared in the same manner as in Example 1-1. Subsequently, the obtained flat plate test piece was heat-treated at 300° C. for 3 hours to obtain a heat-treated resin molded article.

Example 3-2

95 parts by mass of the wholly aromatic liquid crystalline polyester resin obtained in Example 1-16 and 5 parts by mass of the wholly aromatic liquid crystalline polyester resin obtained in Comparative Example 1-2 were mixed in a powder state, and the mixture was subjected to two-axis kneading at 350° C. using Labo Plasto Micro manufactured by Toyo Seiki Seisaku-sho, Ltd., to obtain resin composition pellets. Using the obtained resin composition pellets, a flat plate test piece was prepared in the same manner as in Example 1-1. Subsequently, the obtained flat plate test piece was heat-treated at 300° C. for 3 hours to obtain a heat-treated resin molded article.

Example 3-3

The same manner as in Example 1-1 was taken, except that the monomer charge was changed to 2 mol % of HNA, 14 mol % of HQ, 14 mol % of NADA, and 70 mol % of HBA, and as a result, Wholly aromatic liquid crystalline polyester resin A was obtained. Subsequently, the liquid crystallinity of the obtained Wholly aromatic liquid crystalline polyester resin A was confirmed in the same manner as described above.

Next, 90 parts by mass of the wholly aromatic liquid crystalline polyester resin obtained in Example 1-16 and 10 parts by mass of Wholly aromatic liquid crystalline polyester resin A obtained above were mixed in a powder state, and the mixture was subjected to two-axis kneading at 350° C. using Labo Plasto Micro manufactured by Toyo Seiki Seisakusho, Ltd., to obtain resin composition pellets. Using the obtained resin composition pellets, a flat plate test piece was prepared in the same manner as in Example 1-1. Subsequently, the obtained flat plate test piece was heat-treated at 300° C. for 3 hours to obtain a heat-treated resin molded article.

Example 3-4

99 parts by mass of the wholly aromatic liquid crystalline polyester resin obtained in Example 1-16 and 1 part by mass of amorphous polyacrylate resin (UNITIKA LTD., U powder L type) were mixed in a powder state, and the mixture was subjected to two-axis kneading at 350° C. using Labo Plasto Micro manufactured by Toyo Seiki Seisakusho, Ltd to obtain resin composition pellets. Using the obtained resin composition pellets, a flat plate test piece was prepared in the same manner as in Example 1-1. Subsequently, the obtained flat plate test piece was heat-treated at 300° C. for 3 hours to obtain a heat-treated resin molded article, <Performance Evaluation>

The heat-treated resin molded article obtained in Example 1 was measured for enthalpies $\Delta H_1$ and $\Delta H_2$ and temperatures $Tm_1$ and $Tm_2$ in the same manner as in Test Example 1. Similarly to Test Example 1, dielectric properties at 10 GHz were measured for each type of samples by N=4, and the average values of the 4 measurements are shown in Table 4.

TABLE 4

| | Annealing temperature (° C.) | Differential scanning calorimetry (DSC) | | | | | Dielectric loss parameter | | | |
|---|---|---|---|---|---|---|---|---|---|---|
| | | | | | | | Before heat treatment | | After heat treatment | |
| | | $\Delta H_1$ (J/g) | $\Delta H_2$ (J/g) | $\Delta H_1/\Delta H_2$ | $Tm_1$ (° C.) | $Tm_2$ (° C.) | Relative permittivity Er | Dielectric loss tangent tan$\delta$ ($\times 10^{-3}$) | Relative permittivity Er | Dielectric loss tangent tan$\delta$ ($\times 10^{-3}$) |
| Example 3-1 | 300 | 11.1 | 1.3 | 8.5 | 321 | 320 | 3.6 | 0.67 | 3.6 | 0.48 |
| Example 3-2 | 300 | 10.9 | 1.8 | 6.1 | 322 | 319 | 3.6 | 0.68 | 3.6 | 0.50 |
| Example 3-3 | 300 | 9.1 | 1.4 | 6.5 | 322 | 309 | 3.6 | 0.70 | 3.6 | 0.58 |
| Example 3-4 | 300 | 9.3 | 1.4 | 6.6 | 321 | 321 | 3.5 | 0.86 | 3.6 | 0.50 |

[Test Example 4] Examination of Film Shape

In Test Example 4, the heat-treated resin molded article was confirmed as exhibiting excellent dielectric properties when it was in the form of a film.

<Production of Resin Molded Article>

Example 4-1

The wholly aromatic liquid crystalline polyester resin obtained in Example 1-16 was subjected to two-axis kneading in a Labo Plast Micro manufactured by Toyo Seiki Seisakusho, Ltd., and pelletized at a temperature of 360° C. at the kneading section to obtain resin pellets. Subsequently, using the obtained resin pellets, the molten resin was extruded from a T die having a die width of 120 mm by a two-axis extruder (KZW-30MG; no vent: manufactured by Technobell Co., Ltd.), passed through a cooling roll, and then wound up by a winding roll to form a resin film. The respective set temperatures at the time of manufacturing were: a die temperature of 337° C., a kneading section temperature of 340° C., a roll temperature of 50° C., and a winding roll temperature of room temperature. When the screw rotation was 150 rpm and the winding speed was 3 m/min, a uniform film having a width of 90 mm and an average film thickness of about 50 μm was obtained. Subsequently, the obtained resin film was heat-treated at 300° C. for 3 hours to obtain a heat-treated resin molded article in a film form.

Comparative Example 4-1

27 mol % of HNA and 73 mol % of HBA were added to a polymerization vessel having a stirring blade, potassium acetate was charged as a catalyst, nitrogen substitution was carried out 3 times by reducing the pressure of the polymerization vessel and injecting nitrogen into the polymerization vessel, the temperature was increased to 150° C., and the acetylation reaction was carried out under reflux for 2 hours. Thereafter, the temperature was increased to 350° C. for 5 hours, and then the pressure was reduced to 10 Torr (i.e., 1330 Pa) for 20 minutes, and solution polymerization was carried out while low-boiling components were distilled out. Subsequently, nitrogen was introduced, the pressure was changed from a reduced state to a normal pressure and then to a pressurized state, and the wholly aromatic liquid crystalline polyester resin was discharged from the lower portion of the polymerization vessel. Using a polarizing microscope (trade name: 13H-2) manufactured by Olympus Corporation equipped with a hot stage (trade name: FP82HT) for a microscope manufactured by Mettler, a sample of the wholly aromatic liquid crystalline polyester resin was heated and melted on a microscope heating stage, and liquid crystallinity was confirmed from the presence or absence of optical anisotropy.

Next, using the obtained wholly aromatic liquid crystalline polyester resin, a resin film was obtained in the same manner as in Example 4-1. Subsequently, the obtained resin film was heat-treated at 250° C. for 3 hours to obtain a heat-treated resin molded article in a film form.

<Performance Evaluation>

The heat-treated resin molded articles in a film form obtained in the Examples and Comparative Examples were measured for enthalpies $\Delta H_1$ and $\Delta H_2$ and temperatures $Tm_1$ and $Tm_2$ in the same manner as in Test Example 1. Note that, the differential scanning calorimetry was measured for each type of samples by N=1. Similarly to Test Example 1, the dielectric properties at 10 GHz were measured for each type of samples by N=4, and the average values of the 4 measurements are shown in Table 5.

TABLE 5

| | Annealing Temperature (° C.) | Differential scanning calorimetry (DSC) | | | | | Dielectric loss parameter | |
|---|---|---|---|---|---|---|---|---|
| | | | | | | | Relative permittivity Er | Dielectric loss tangent tan$\delta$ ($\times 10^{-3}$) |
| | | $\Delta H_1$ (J/g) | $\Delta H_2$ (J/g) | $\Delta H_1/\Delta H_2$ | $Tm_1$ (° C.) | $Tm_2$ (° C.) | | |
| Example 4-1 | 300 | 11.1 | 1.1 | 10.1 | 321 | 320 | 3.2 | 0.35 |
| Comp. Ex 4-1 | 250 | 2.8 | 1.3 | 2.2 | 269 | 275 | 3.4 | 1.09 |

[Test Example 5] Evaluation of Dielectric Loss Tangent at 81 GHz and 34 GHz and Temperature Dependency of Dielectric Loss Tangent at 34 GHz of Heat Treated Molded Articles In Test Example 5, the resin molded article subjected to heat treatment of the present invention was confirmed to exhibit an excellent low dielectric loss tangent at various frequencies. The resin molded article subjected to heat treatment of the present invention was also confirmed to exhibit an excellent low dielectric loss tangent in each temperature range at a specific frequency, and that the rate of change of the dielectric loss tangent with respect to the temperature was small and stable.

<Dielectric Loss Tangent Measurement (34 and 81 GHz)>

A 13 mm square flat plate was cut from the center of a 30 mm×30 mm×0.4 mm heat-treated injection molded flat plate of the wholly aromatic liquid crystalline polyester resins obtained in Examples 1-2 and 1-16, and Comparative Examples 1-1 and 1-2 to prepare test pieces. These test pieces were loaded into a 100 GHz resonator and a 36 GHz resonator under the environment of 25° C. and 50% moisture at Kojin-Shimizu Laboratory, Graduate School of Engineering, Utsunomiya University, and the dielectric loss tangent was measured at room temperature by the cylindrical cavity resonator method. Although the resonators for 100 GHz and 36 GHz were used, the actual measurement frequency was around 81 GHz and around 34 GHz due to the resonance characteristics of the material.

TABLE 6

|  | Before heat treatment dielectric loss tangent $\tan\delta$ ($\times 10^{-3}$) | | After heat treatment dielectric loss tangent $\tan\delta$ ($\times 10^{-3}$) | | Heat treatment temperature (° C.) |
|---|---|---|---|---|---|
|  | 34 GHz | 81 GHz | 34 GHz | 81 GHz |  |
| Example 1-2 | 1.2 | 2.4 | 1.0 | 1.7 | 300 |
| Example 1-16 | 1.1 | 2.1 | 0.9 | 1.8 | 300 |
| Comp. Ex 1-1 | 3.2 | 4.4 | 3.0 | 4.5 | 335 |
| Comp. Ex 1-2 | 2.4 | 3.8 | 2.5 | 3.5 | 270 |

<Dielectric Loss Tangent Measurement at 34 GHz (Temperature Dependency)>

A 13 mm square flat plate was cut from the center of a 30 mm×30 mm×0.4 mm heat-treated injection molded flat plate of the wholly aromatic liquid crystalline polyester resins obtained in Examples 1-2 and 1-16, and Comparative Examples 1-1 and 1-2 to prepare test pieces. These test pieces were loaded into a 36 GHz resonator at Kojin-Shimizu Laboratory, Graduate School of Engineering, Utsunomiya University, and the dielectric loss tangent was measured by the cylindrical cavity resonator method according to the following procedures. Specifically, the resonator with the test piece set was placed in a constant temperature bath, and the constant temperature bath was set to the temperature of 105° C., and then left for 2 hours. Thereafter, the constant temperature bath was set to 20° C., and then the temperature in the bath was naturally lowered, and the dielectric loss tangent at this time was measured at 1° C. intervals. The temperature dependency (change) of the dielectric loss tangent from 30° C. to 100° C. of the measurement sample after the heat treatment is shown in FIG. 1. Table 7 shows the dielectric loss tangent at 30° C. and 100° C. and the change rate of the dielectric loss tangent from 30° C. to 100° C. Although a resonator for 36 GHz was used, the actual measurement frequency was around 34 GHz due to the resonance characteristics of the material.

TABLE 7

|  | Before heat treatment | | | After heat treatment | | | |
|---|---|---|---|---|---|---|---|
|  | dielectric loss tangent $\tan\delta$ ($\times 10^{-3}$) | | change rate of dielectric loss tangent at 30° C. and 100° C. ($\times 10^{-5}$/° C.) | dielectric loss tangent $\tan\delta$ ($\times 10^{-3}$) | | change rate of dielectric loss tangent at 30° C. and 100° C. ($\times 10^{-5}$/° C.) | heat treatment temperature (° C.) |
|  | 30° C. | 100° C. |  | 30° C. | 100° C. |  |  |
| Example 1-2 | 1.0 | 2.0 | 1.4 | 0.9 | 1.7 | 1.1 | 300 |
| Example 1-16 | 1.0 | 1.8 | 1.1 | 0.9 | 1.6 | 1.0 | 300 |
| Comp. Ex 1-1 | 3.1 | 8.0 | 7.0 | 3.0 | 9.2 | 8.8 | 335 |
| Comp. Ex 1-2 | 2.4 | 4.5 | 3.0 | 2.6 | 4.5 | 2.7 | 270 |

The invention claimed is:

1. A resin molded article comprising a wholly aromatic liquid crystalline polyester resin and formed by being subjected to heat treatment, wherein
an enthalpy change $\Delta H_1$ at a melting point of a first cycle and an enthalpy change $\Delta H_2$ at a melting point of a second cycle of a temperature elevation process measured by a differential scanning calorimeter satisfy $\Delta H_1/\Delta H_2 \geq 2.0$, and
a dielectric loss tangent measured by a split-post dielectric resonator (SPDR) method at a measurement frequency of 10 GHz is $0.85 \times 10^{-3}$ or less.

2. The resin molded article according to claim 1, wherein the enthalpy change $\Delta H_1$ at the melting point in the first cycle of the temperature elevation process measured by a differential scanning calorimeter is 3.5 J/g or more.

3. The resin molded article according to claim 1, wherein the wholly aromatic liquid crystalline polyester resin contains three or more structural units.

4. The resin molded article according to claim 3, wherein the wholly aromatic liquid crystalline polyester resin comprises 10 mol % or more of structural unit (I) derived from 6-hydroxy-2-naphthoic acid with respect to the structural unit of the entire wholly aromatic liquid crystalline polyester resin.

5. The resin molded article according to claim 4, wherein the wholly aromatic liquid crystalline polyester resin further comprises structural unit (II) derived from an aromatic diol compound and structural unit (III) derived from an aromatic dicarboxylic acid.

6. The resin molded article according to claim 5, wherein the wholly aromatic liquid crystalline polyester resin further comprises structural unit (IV) derived from p-hydroxybenzoic acid.

7. An electrical and electronic component comprising the resin molded article according to claim 1.

8. The resin molded article according to claim 2, wherein the wholly aromatic liquid crystalline polyester resin contains three or more structural units.

9. The resin molded article according to claim 8, wherein the wholly aromatic liquid crystalline polyester resin comprises 10 mol % or more of structural unit (I) derived from 6-hydroxy-2-naphthoic acid with respect to the structural unit of the entire wholly aromatic liquid crystalline polyester resin.

10. The resin molded article according to claim 9, wherein the wholly aromatic liquid crystalline polyester resin further comprises structural unit (II) derived from an aromatic diol compound and structural unit (III) derived from an aromatic dicarboxylic acid.

11. The resin molded article according to claim 10, wherein the wholly aromatic liquid crystalline polyester resin further comprises structural unit (IV) derived from p-hydroxybenzoic acid.

12. An electrical and electronic component comprising the resin molded article according to claim 11.

* * * * *